United States Patent
Zeng

(10) Patent No.: US 11,422,831 B2
(45) Date of Patent: Aug. 23, 2022

(54) APPLICATION CLEANING METHOD, STORAGE MEDIUM AND ELECTRONIC DEVICE

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 352 days.

(21) Appl. No.: 16/652,955

(22) PCT Filed: Aug. 27, 2018

(86) PCT No.: PCT/CN2018/102426
§ 371 (c)(1),
(2) Date: Apr. 1, 2020

(87) PCT Pub. No.: WO2019/062416
PCT Pub. Date: Apr. 4, 2019

(65) Prior Publication Data
US 2021/0216331 A1    Jul. 15, 2021

(30) Foreign Application Priority Data
Sep. 30, 2017    (CN) .......................... 201710944852.X

(51) Int. Cl.
*G06F 16/28*    (2019.01)
*G06F 9/445*    (2018.01)
(Continued)

(52) U.S. Cl.
CPC ........ *G06F 9/44594* (2013.01); *G06F 1/3246* (2013.01); *G06F 9/5022* (2013.01);
(Continued)

(58) Field of Classification Search
CPC .................................................... G06F 16/285
See application file for complete search history.

(56) References Cited

U.S. PATENT DOCUMENTS 6,304,775 B1 *  10/2001  Iasemidis ............. A61B 5/4094
                                                      600/544
7,392,156 B2 *   6/2008  Weber ..................... G06F 17/18
                                                      702/180
(Continued)

FOREIGN PATENT DOCUMENTS

CN    103646086    3/2014
CN    104111920    10/2014
(Continued)

OTHER PUBLICATIONS

IPI, Office Action for IN Application No. 202017017987, dated Jul. 5, 2021.
(Continued)

*Primary Examiner* — Jae U Jeon
(74) *Attorney, Agent, or Firm* — Hodgson Russ LLP

(57) ABSTRACT

Disclosed is an application cleaning method and device, a storage medium and an electronic device. In the embodiments of the present disclosure, the method involves: collecting multi-dimensional features of an application as samples, and constructing a sample set of the application; according to information gain ratios of the features with regard to sample classification, carrying out sample classification on the sample set so as to construct a decision tree model of the application; according to a prediction time, collecting corresponding multi-dimensional features of the application as prediction samples; and according to the prediction samples and the decision tree model, predicting whether the application can be cleaned.

20 Claims, 6 Drawing Sheets

(51) Int. Cl.
  *G06N 20/20* (2019.01)
  *G06F 1/3246* (2019.01)
  *G06F 9/50* (2006.01)
  *G06N 5/00* (2006.01)
  *G06N 5/04* (2006.01)

(52) U.S. Cl.
  CPC ........... *G06F 16/285* (2019.01); *G06N 5/003* (2013.01); *G06N 5/04* (2013.01); *G06N 20/20* (2019.01)

(56) References Cited

U.S. PATENT DOCUMENTS

| | | | |
|---|---|---|---|
| 9,471,624 B1* | 10/2016 | Patil | G06F 16/24 |
| 2005/0076344 A1* | 4/2005 | Goring | G06F 9/45508 |
| | | | 717/115 |
| 2016/0063396 A1 | 3/2016 | Cheng et al. | |
| 2017/0116228 A1* | 4/2017 | Alberg | G06F 16/258 |
| 2018/0143746 A1* | 5/2018 | Stern | H04L 65/4084 |
| 2019/0264936 A1* | 8/2019 | Bailey | G05B 15/02 |
| 2019/0361606 A1* | 11/2019 | Goker | G06F 3/064 |

FOREIGN PATENT DOCUMENTS

| | | |
|---|---|---|
| CN | 104123592 | 10/2014 |
| CN | 104216740 | 12/2014 |
| CN | 105550583 | 5/2016 |
| CN | 105868298 | 8/2016 |
| CN | 106294667 | 1/2017 |
| CN | 106793031 | 5/2017 |
| CN | 106844225 | 6/2017 |
| CN | 106919448 | 7/2017 |
| CN | 106951232 | 7/2017 |
| CN | 107133094 | 9/2017 |
| CN | 107203774 | 9/2017 |
| CN | 107678531 | 2/2018 |
| CN | 107704070 | 2/2018 |

OTHER PUBLICATIONS

EPO, Supplementary European Search Report for EP 18860155, dated Nov. 2, 2020.

Xiaoliang, Zhu et al., "Research and application of the improved algorithm C4.5 on Decision tree," 2009 International Conference on Test and Measurement, IEEE, pp. 184-187, Dec. 5, 2009, Hong Kong, China.

SIPO, Third Office Action for CN Application No. 201710944852.X, dated May 28, 2020.

WIPO, Written Opinion for PCT/CN2018/102426, dated Dec. 3, 2018.

SIPO, First Office Action for CN Application No. 201710944852.X, dated Jun. 28, 2019.

SIPO, Second Office Action for CN Application No. 201710944852.X, dated Feb. 6, 2020.

WIPO, ISR for PCT/CN2018/102426, dated Dec. 3, 2018.

* cited by examiner

APPLICATION CLEANING METHOD, STORAGE MEDIUM AND ELECTRONIC DEVICE

CROSS-REFERENCE TO RELATED APPLICATION

This application is a U.S. national phase application of International Application No. PCT/CN2018/102426, filed Aug. 27, 2018, which claims priority to Chinese Patent Application No. 201710944852 X, filed Sep. 30, 2017, the entire disclosures of which are incorporated herein by reference.

TECHNICAL FIELD

The present disclosure relates to the field of electronic device communication technologies, in particular, to an application cleaning method, apparatus, storage medium, and electronic device.

BACKGROUND

At present, electronic devices such as smart phones typically have multiple applications running simultaneously, with one application running in the foreground and other applications running in the background. If the application running in the background is not cleared for a long time, the available memory of the electronic device is reduced, the occupancy rate of the central processing unit (CPU) is too high, causing the electronic device to run slower, jamming and too fast power consumption and the like.

SUMMARY

The embodiment of the disclosure provides an application cleaning method, a device, a storage medium and an electronic device, which can improve the running fluency of the electronic device and reduce power consumption.

In a first aspect, an application cleaning method provided by the embodiment of the present disclosure includes:

Collecting multi-dimensional features of an application as samples, and constructing a sample set of the application;

Classifying the sample set according to information gain ratios of the multi-dimensional features relative to a sample classification to construct a decision tree model of the application, wherein an output of the decision tree model includes cleanable or uncleanable;

Collecting, at a prediction time, multi-dimensional features of the application as prediction samples;

Predicting whether the application is cleanable according to the prediction samples and the decision tree model.

In a second aspect, an application cleaning device provided by the embodiment of the present disclosure includes:

a first collecting unit, configured to collect multi-dimensional features of an application as samples, and constructing a sample set of the application;

a classifying unit, configured to perform sample classification on the sample set according to information gain ratios of the multi-dimensional features relative to a sample classification to construct a decision tree model of the application, wherein an output of the decision tree model includes cleanable or uncleanable;

a second collecting unit, configured to collect the multi-dimensional features of the application as prediction samples according to a prediction time;

And a predicting unit, configured to predict whether the application is cleanable according to the prediction sample and the decision tree model.

In a third aspect, a storage medium provided by the embodiment of the present disclosure has a computer program stored thereon, and when the computer program is run on a computer, the computer is caused to perform an application cleaning method provided by any embodiment of the present disclosure.

In a fourth aspect, an electronic device provided by an embodiment of the present disclosure includes a processor and a memory, where the memory has a computer program, and the processor is used to execute an application cleaning method provided by any embodiment of the present disclosure by calling the computer program.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings can also be obtained from those skilled in the art based on these drawings without paying any creative effort.

DETAILED DESCRIPTION

Figure 1:
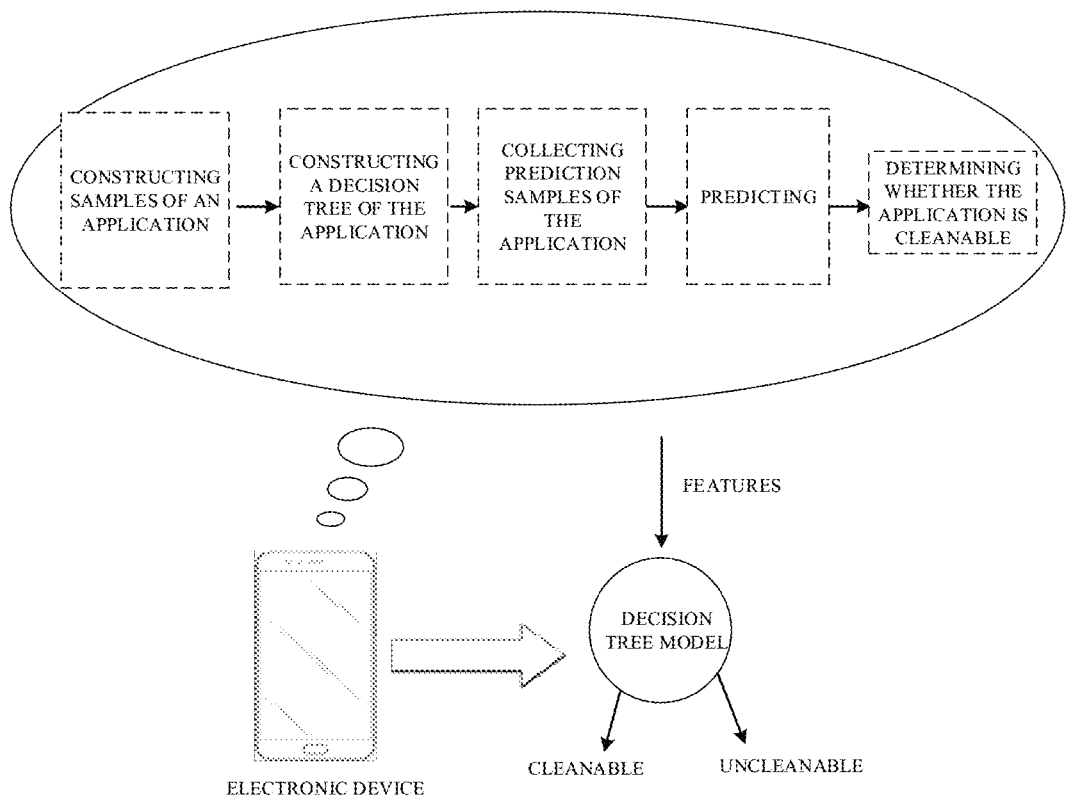
FIG. 1 is a schematic diagram of an application scenario of an application cleaning method according to an embodiment of the present disclosure.

References to "an embodiment" herein mean that a particular feature, structure, or characteristic described in connection with the embodiments can be included in at least one embodiment of the present disclosure. The appearances of the phrases in various places in the specification are not necessarily referring to the same embodiments and are not exclusive or alternative embodiments that are mutually exclusive. Those skilled in the art will understand and implicitly understand that the embodiments described herein can be combined with other embodiments.

An embodiment of the present disclosure provides an application cleaning method, including:

Collecting multi-dimensional features of an application as samples, and constructing a sample set of the application;

Classifying the sample set according to information gain ratios of the features for a sample classification to construct a decision tree model of the application, wherein an output of the decision tree model includes cleanable or not cleanable;

Collecting, at a prediction time, multi-dimensional features of the application as prediction samples;

Predicting whether the application is cleanable according to the prediction samples and the decision tree model.

In some embodiments, classifying the sample set according to information gain ratios of the features to a sample classification to construct a decision tree model of the application, including:

Generating a root node of the decision tree, and taking the sample set as node information of the root node;

Determining the sample set of the root node as a target sample set to be classified currently;

Obtaining information gain ratios of the features in the target sample set relative to the target sample set classification;

Selecting a current partitioning feature from the features according to the information gain ratios;

Dividing the sample set according to the partitioning feature to obtain a plurality of sub-sample sets;

Removing the partitioning feature of the sample in each of the sub-sample sets to obtain removed sub-sample sets;

Generating a child node of a current node, and taking one of the removed sub-sample sets as node information of the child node;

Determining whether the child node meets a preset classification termination condition;

When the child node does not meet a preset classification termination condition, updating the target sample set by the removed sub-sample set, and returning to perform the step of obtaining information gain ratios of the features in the target sample set relative to the target sample set classification;

When the child node meets the preset classification termination condition, taking the child node as a leaf node, and setting an output of the leaf node according to a category of the sample in the corresponding removed sub-sample set, and the category of the sample includes cleanable or uncleanable.

In some embodiments, dividing the target sample set according to the partitioning feature includes:

Obtaining feature values of the partitioning feature in the target sample set;

Dividing the target sample set according to the feature values.

In some embodiments, selecting a current partitioning feature from the features according to the information gain ratios includes:

Selecting a maximum target information gain ratio in the information gain ratios;

Determining whether the target information gain ratio is larger than a preset threshold;

When the target information gain ratio is larger than a preset threshold, determining a feature corresponding to the target information gain ratio as the current partitioning feature.

In some embodiments, the application cleaning method further includes:

When the target information gain ratio is not larger than the preset threshold, taking the current node as a leaf node, and taking the category of which the number of the sample is the largest as the output of the leaf node.

In some embodiments, determining whether the child node meets a preset classification termination condition includes:

Determining whether the number of the category of the samples in the removed sub-sample set corresponding to the child node is a preset number;

When the number of categories of the samples in the removed sub-sample set corresponding to the child node is a preset number, determining that the child node meets a preset classification termination condition.

In some embodiments, obtaining information gain ratios of the features in the target sample set relative to the target sample set classification includes:

Obtaining an information gain of the feature relative to the target sample set classification;

Obtaining splitting information of the features relative to the target sample set classification;

Obtaining the information gain ratios of the features relative to the target sample set classification according to the information gains and the splitting information.

In some embodiments, obtaining the information gains of the features relative to the target sample set classification includes:

Obtaining an empirical entropy of the target sample set classification;

Obtaining a conditional entropy of the feature for a classification result of the target sample set;

Obtaining the information gain of the feature for the target sample set classification according to the conditional entropy and the empirical entropy.

In some embodiments, obtaining the information gain ratios of the features relative to the target sample set classification according to the information gains and the splitting information, including:

calculating the information gain ratio of the feature relative to the target sample set classification by the following formula:

$$g_R(D, A) = \frac{g(D, A)}{H_A(D)}$$

Wherein $g_R(D,A)$ is the information gain ratio of a feature A relative to a sample set D classification, $g(D,A)$ is the information gain of the feature A relative to the sample classification, and $H_A(D)$ is the splitting information of the feature A;

And, $g(D, A)$ can be calculated by the following formula:

$$g(D, A) = H(D) - H(D | A) = H(D) - \sum_{i=1}^{n} p_i H(D | A = A_i)$$

Wherein $H(D)$ is the empirical entropy of the sample set D classification, $H(D|A)$ is the conditional entropy of the feature A relative to the sample set D classification, and $p_i$ is the probability of a sample whose A feature taking the i-th value in the sample set D. n and i are positive integers larger than zero.

The embodiment of the present disclosure provides an application cleaning method. The execution main body of the application cleaning method may be an application cleaning device provided by an embodiment of the present disclosure, or an electronic device integrated with the application cleaning device, wherein the application cleaning device may be implemented in hardware or software. The electronic device may be a device such as a smart phone, a tablet computer, a palmtop computer, a notebook computer, or a desktop computer or the like.

Referring to FIG. 1, FIG. 1 is a schematic diagram of an application scenario of an application cleaning method according to an embodiment of the present disclosure. Take the application device integrated in an electronic device as an example. The electronic device can collect multi-dimensional features of the application as samples and construct a sample set of the application; classifying the sample set according to information gain ratios of the features for a sample classification to construct a decision tree model of the application, wherein an output of the decision tree model includes cleanable or not cleanable; Collecting, at a prediction time, multi-dimensional features of the application as prediction samples; and predicting whether the application is cleanable according to the prediction samples and the decision tree model.

Specifically, for example, as shown in FIG. 1, take determining whether an application a (such as a mailbox application, a game application, etc.) running in the background can be cleaned up as an example. In a historical time period, the multi-dimensional feature (such as the duration of the application a running in the background, the time information of the application a running time, etc.) of the application a can be collected as the sample, to construct the sample set of the application a, classifying the sample set according to the information gain ratio of the feature (such as the duration of the application a running in the background, the time information of the application a running time, etc.) for the sample classification to construct a decision tree model of the application a; the multi-dimensional features (for example, the time duration of the application a running in the background at the time t, the time information of the application a running at time t, etc.) corresponding to the application are collected according to the prediction time (such as t) as a prediction sample; whether the application a can be cleaned is predicted according to the prediction sample and the decision tree model. In addition, the electronic device cleans up the application a when the application is predicted to be cleanable.

Figure 2:
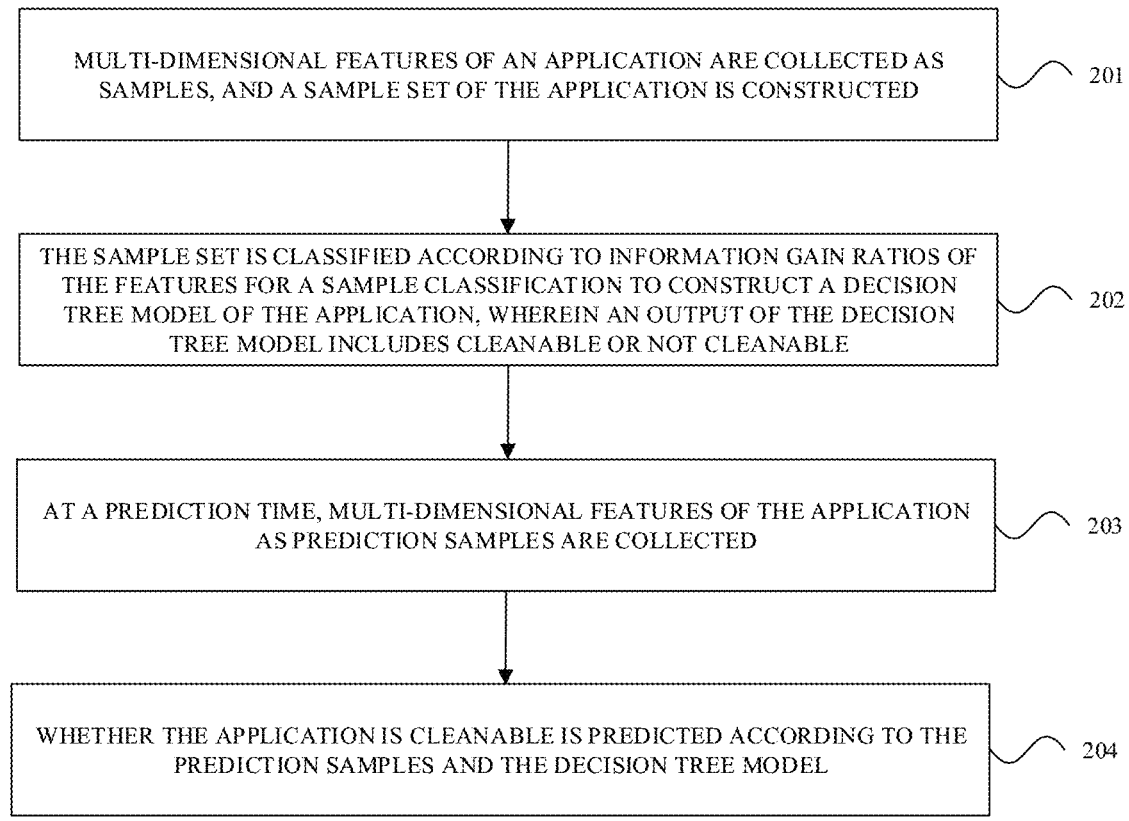
FIG. 2 is a schematic flowchart of an application cleaning method provided by an embodiment of the present disclosure.

Referring to FIG. 2, FIG. 2 is a schematic flowchart of an application cleaning method according to an embodiment of the present disclosure. The specific process of the application cleaning method provided by the embodiment of the present disclosure may be as follows:

Step 201, multi-dimensional features of an application are collected as samples, and a sample set of the application is constructed.

The application mentioned in this embodiment may be any application installed on the electronic device, such as an office application, a communication application, a game application, a shopping application, and the like. The application may include an application running in the foreground, that is, a foreground application, and may also include an application running in the background, that is, a background application.

The multi-dimensional feature of the application has a dimension of a certain length, and the parameters in each dimension correspond to a feature information of the application, that is, the multi-dimensional feature is composed of a number of features. The number of features may include feature information related to the application itself, for example, the duration of the application after switched to the background; the duration of screen-off of the electronic device after the application switched to the background; the number of times the application enters the foreground; the time period during which the application is in the foreground; the manner in which the application enters the background, for example, by a home button (home button), by a return button, and by other applications, and the type of application, including a first level (common application), a second level (other applications), and the like.

The plurality of feature information may further include related feature information of the electronic device in which the application is located, for example, a screen-off time of the electronic device, a screen-on time of the electronic device, a current power, a wireless network connection status of the electronic device, whether the electronic device is in a charging state, or the like.

Wherein, a sample set of an application may include a plurality of samples, each sample including a multi-dimensional feature of the application. The sample set of the application may include multiple samples collected at a preset frequency during the historical time period. The historical time period may be, for example, the past 7 days or 10 days; the preset frequency may be, for example, collected once every 10 minutes, or once every half hour. It can be understood that datum of the multi-dimensional feature of the application collected at one time constitutes one sample and multiple samples constitute a sample set.

After constituting the sample set, each sample in the sample set can be marked to obtain a sample tag for each sample. Since the implementation of the present disclosure is to predict whether the application can be cleaned, the labeled sample tag includes cleanable and uncleanable, that is, the sample category includes cleanable and uncleanable. Specifically, each sample in the sample set can be marked according to the user's historical usage habits of the application. For example, after the application enters the background for 30 minutes, the user closes the application and this sample is marked as "cleanable"; for example, after the application enters the background and running in the background for 3 minutes, the user switch the application to the foreground and this sampler is marked as "uncleanable". Specifically, the value "1" can be used to indicate "cleanable", the value "0" is used to mean "uncleanable", and vice versa.

Step 202, the sample set is classified according to information gain ratios of the features for a sample classification to construct a decision tree model of the application, wherein an output of the decision tree model includes cleanable or not cleanable.

In an embodiment, in order to facilitate sample classification, the feature information that is not directly represented by the value in the multi-dimensional feature information of the application may be quantized by a specific value, for example, the feature information of a wireless network connection state of the electronic device may use the value 1 indicate a normal state, and the value 0 indicate an abnormal state (or vice versa); for example, for the feature information of whether the electronic device is in a charging state, the value 1 may be used to indicate the state of charge, and the value 0 indicate the uncharged state (or vice versa).

Embodiments of the present disclosure may perform sample classification on the sample set according to information gain ratios of the features for a sample classification to construct a decision tree model of an application. For example, a decision tree model can be constructed based on the C4.5 algorithm.

Among them, the decision tree is a tree built on the basis of decision-making. In machine learning, a decision tree is a predictive model that represents a mapping relationship between object properties and object values. Each node represents an object, and each forked path in the tree represents a certain possible attribute values, and each leaf node corresponds to the value of the object represented by the path from the root node to the leaf node. The decision tree has only a single output. If there are multiple outputs, separate decision trees can be established to handle different outputs, respectively.

Among them, the C4.5 algorithm is a kind of decision tree. It is a series of algorithms used in the classification problem of machine learning and data mining. It is an important algorithm improved by ID3. Its goal is to supervise learning: given a data set, each of these tuples can be described by a set of attribute values, each of which belongs to a class in a mutually exclusive category. The goal of C4.5 is to find a mapping relationship from attribute values to categories by learning, and this mapping relationship can be used to classify entities with unknown new categories.

ID3 (Iterative Dichotomiser 3 Generation, Iterative Dichotomiser 3 Generation) is based on the Occam razor principle, that is, to do more with as few things as possible. In information theory, the smaller the expected information, the greater the information gain and the higher the purity. The core idea of the ID3 algorithm is to measure the choice of attributes with information gain and select the attribute with the largest information gain after splitting to split. The algorithm uses a top-down greedy search to traverse possible decision spaces.

In the embodiment of the present disclosure, the information gain ratio may be defined as the ratio of the information gain of the feature relative to the sample classification and the split information of the feature relative to the sample classification. The specific information gain ratio obtaining method is described below.

The information gain is set for every feature. For a feature t, the amount of information when the feature in the system and the amount of information when the system without the feature are both observed. The difference between the two cases is the amount of information that the feature brings to the system, that is, the information gain.

The splitting information is used to measure the breadth and uniformity of the feature splitting data (such as the sample set), and the splitting information can be the entropy of the feature.

The process of classifying the sample set according to the information gain ratio will be described in detail below. For example, the classification process may include the following steps:

Generating a root node of the decision tree, and taking the sample set as node information of the root node;

Determining the sample set of the root node as a target sample set to be classified currently;

Obtaining information gain ratios of the features in the target sample set for the target sample set classification;

Selecting a current partitioning feature from the features according to the information gain ratios;

Dividing the sample set according to the partitioning feature to obtain a plurality of sub-sample sets;

Removing the partitioning feature of the sample in each of the sub-sample sets to obtain removed sub-sample sets;

Generating a child node of the current node, and taking the removed sub-sample set as node information of the child node;

Determining whether the child node meets a preset classification termination condition;

When the child node does not meet a preset classification termination condition, updating the target sample set to the removed sub-sample set, and returning to perform the step of obtaining information gain ratios of the features in the target sample set to the target sample set classification;

When the child node meets a preset classification termination condition, taking the child node as a leaf node, and setting an output of the leaf node according to a category of the sample in the corresponding removed sub-sample set, and the category of the sample includes cleanable or uncleanable.

The partitioning feature is a feature selected from the features according to the information gain ratio of each feature relative to the sample set classification and is used to classify the sample set. Among them, there are various ways to select the feature according to the information gain ratio. For example, in order to improve the accuracy of the sample classification, the feature corresponding to the maximum information gain ratio may be selected as the partitioning feature.

The category of the sample may include two categories: cleanable and uncleanable. The category of each sample may be represented by a sample mark. For example, when the sample is marked as a numerical value, the value "1" means "cleanable", the value "0" means "uncleanable", and vice versa.

When the child node meets the preset classification termination condition, the child node may be used as a leaf node, that is, the sample set classification of the child node is stopped, and the output of the leaf node may be set based on the category of the sample in the removed sub-sample set. There are several ways to set the output of a leaf node based on the category of the sample. For example, the category with the maximum number of samples in the removed sub-sample set can be as the output of the leaf node.

The preset classification termination condition may be set according to actual requirements. When the child node meets the preset classification termination condition, the current child node is used as a leaf node, and the sample set corresponding to the child node is stopped for word segmentation; when the child node does not meet the preset classification termination condition, the classification of the sample set corresponding to the child node is continued. For example, the preset classification termination condition may include: whether the number of categories of the samples in the removed sub-sample set of the child node is a preset number, that is, the step "determining whether the child node meets a preset classification termination condition" may include:

Determining whether the number of categories of samples in the removed subsample set corresponding to the child node is a preset number;

When the number of categories of samples in the removed subsample set corresponding to the child node is a preset number, determining that the child node meets the preset classification termination condition;

When the number of categories of samples in the removed subsample set corresponding to the child node is not a preset number, determining that the child node does not meet the preset classification terminal termination condition.

For example, the preset classification termination condition may include: the number of categories of the samples in the removed sub-sample set corresponding to the child node is 1, that is, the sample in the sample set of the child node has only one category. At this time, if the child node meets the preset classification termination condition, the category of the sample in the subsample set is taken as the output of the leaf node. If there is only a sample with the category "cleanable" in the subsample set after removal, then "cleanable" can be used as the output of the leaf node.

In an embodiment, in order to improve the decision accuracy of the decision tree model, a gain ratio threshold may also be set. When the maximum information gain ratio is greater than the threshold, the feature corresponding to the information gain ratio is selected as the partitioning feature. That is, the step of "selecting a current partitioning feature from the features according to the information gain ratios" may include:

Selecting a maximum target information gain ratio in the information gain ratios;

Determining whether the target information gain ratio is greater than a preset threshold;

When the target information gain ratio is greater than a preset threshold, determining a feature corresponding to the target information gain ratio as the current partitioning feature.

In an embodiment, when the target information gain ratio is not greater than a preset threshold, the current node may be used as a leaf node, and the sample category with the maximum number of samples is selected as the output of the leaf node, wherein the sample categories include cleanable or uncleanable.

The preset threshold can be set according to actual needs, such as 0.9, 0.8, and the like.

For example, when the information gain ratio of feature 1 for the sample classification is 0.9, the preset gain ratio threshold is 0.8, since the maximum information gain ratio is greater than the preset threshold, feature 1 can be used as the partitioning feature.

For example, when the preset threshold is 1, the maximum information gain ratio is less than the preset threshold. In this case, the current node can be used as a leaf node, and through analyzing the sample set it can be found that the number of samples whose category is cleanable is the largest, which is larger than the number of samples whose category is uncleanable. At this point, "cleanable" can be used as the output of the leaf node.

Among them, there are various ways to classify the samples according to the partitioning features. For example, the sample sets can be divided based on the feature values of the partitioning features. That is, the step "dividing the sample set according to the partitioning feature" may include:

Obtaining feature values of the partitioning feature in the target sample set;

Dividing the target sample set according to the feature values.

For example, a sample with the same feature value in the sample set can be divided into the same sub-sample set. For example, the feature values of the partitioning features include: 0, 1, and 2, then, the samples whose feature values are 0 can be classified into one category, and the samples with the feature value 1 are classified into one category, and the feature values 2 are classified into one category.

For example, for a sample set D {sample 1, sample 2 ... sample i ... sample n}, the sample includes several features A.

First, all samples in the sample set are initialized, then a root node d is generated, and the sample set D is taken as the node information of the root node a, as described with reference to FIG. 3.

The information gain ratio $g_R(D,A)1, g_R(D,A)2 \ldots g_R(D,A)m$ of each feature such as feature A relative to the sample set classification is calculated; and the maximum information gain ratio $g_R(D,A)$max is selected.

When the maximum information gain ratio $g_R(D,A)$max is less than the preset threshold E, the current node is viewed as a leaf node, and the sample category with the maximum number of samples is selected as the output of the leaf node.

When the maximum information gain ratio $g_R(D,A)$max is larger than a preset threshold E, the feature corresponding to the information gain $g_R(D,A)$max may be selected as the partitioning feature Ag, and the sample set D{sample 1 sample 2 ... sample i ... sample n} is divided according to the partitioning feature Ag. Specifically, for each value ai of Ag, D is divided into several non-empty sets Di according to Ag=ai to be a child node of the current node. For example, the sample set is divided into two sub-sample sets D1 {sample 1, sample 2 ... sample k} and D2 {sample k+1 ... sample n}.

The partitioning feature Ag in the sub-sample sets D1 and D2 is removed, that is, A-Ag. The child nodes d1 and d2 of the root node d are generated, referring to FIG. 3, the sub-sample set D1 is taken as the node information of the child node d1, and the sub-sample set D2 is taken as the node information of the child node d2.

Next, for each child node, A-Ag is taken as a feature, and Di of the child node is used as a data set, the above steps are recursively called to construct a subtree until the preset classification termination condition is satisfied.

Taking a child node d1 as an example, it is determined whether the child node meets the preset classification termination condition. If yes, the current child node d1 is used as a leaf node, and the leaf node output is set according to the category of the sample in the sub-sample set corresponding to the child node d1.

When the child node does not meet the preset classification termination condition, the above-mentioned sub-sample set corresponding to the child node is continued to be classified according to the information gain classification method. For example, a child node d2 can be used as an example to calculate the information gain ratio $g_R(D,A)$ of each features of the A2 sample set relative to the sample classification, and select a maximum information gain ratio $g_R(D,A)$max. When the maximum information gain ratio $g_R(D,A)$max is greater than the preset threshold E, the feature corresponding to the information gain ratio $g_R(D,A)$ is the partitioning feature Ag (such as the feature Ai+1), and the D2 is divided into several sub-sample sets based on the partitioning feature Ag, for example, the D2 can be divided into the sub-sample sets D21, D22, and D23. Then, the partitioning features Ag in each subsample sets D21, D22, and D23 are removed, and the child nodes d21, d22, and d23 of the current node d2 are generated. The sample sets D21, D22, and D23 with removed partitioning features Ag are respectively taken as the node information of the child node d21, d22, and d23, respectively.

Figure 4:
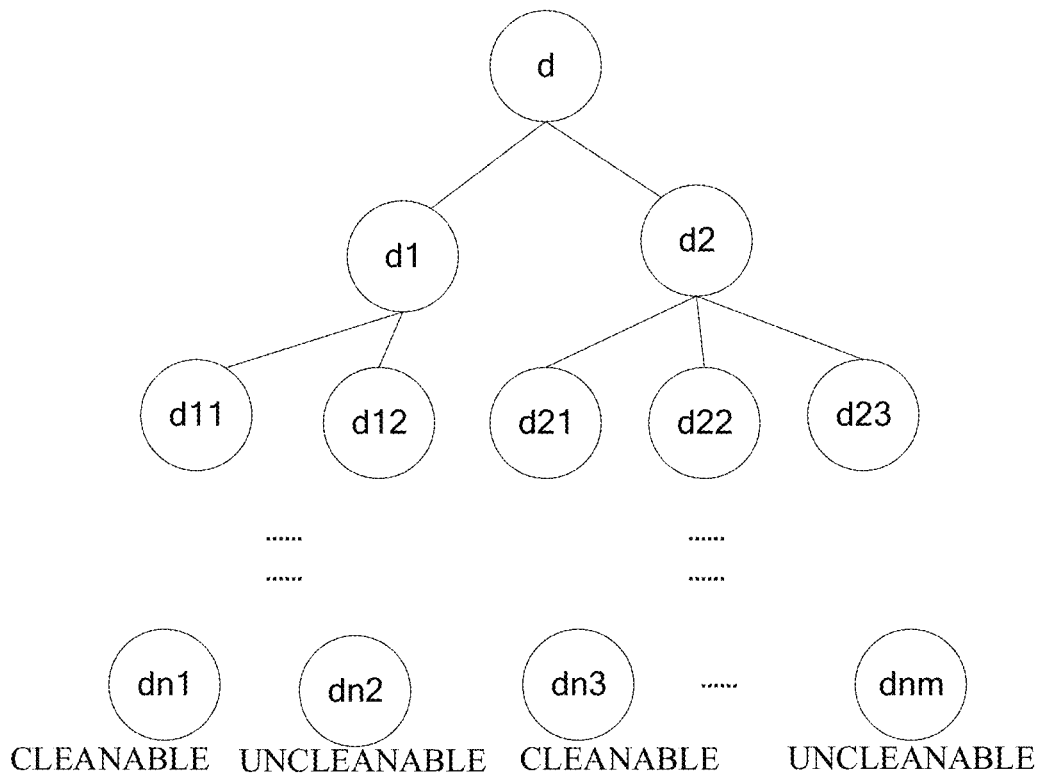
FIG. 4 is a schematic diagram of another decision tree provided by an embodiment of the present disclosure.

In the same manner, the above-mentioned information gain ratio classification way can be used to construct a decision tree as shown in FIG. 4. The output of the leaf node of the decision tree includes "cleanable" or "uncleanable".

In an embodiment, in order to improve the speed and efficiency of prediction by using the decision tree, the feature values of the corresponding partitioning features may also be marked on the path between the nodes. For example, in the above process based on information gain classification, the feature values of the corresponding partitioning features may be marked on the path of the current node and its child nodes.

Figure 5:
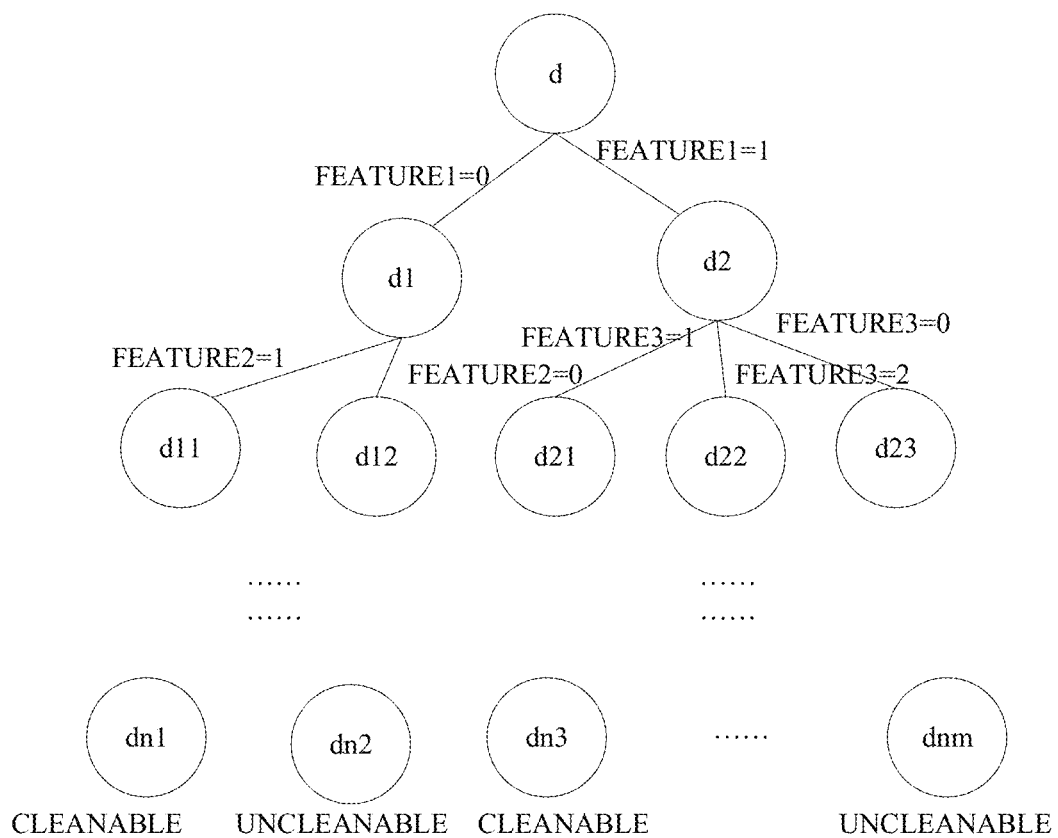
FIG. 5 is a schematic diagram of another decision tree provided by an embodiment of the present disclosure.

For example, the feature values of the partitioning feature Ag include 0 and 1. 1 may be marked on the path between d2 and d. 0 may be marked on the path between a1 and a, and so on. After each division, a decision tree as shown in FIG. 5 can be obtained by marking a corresponding partition feature value such as 0 or 1 on the path of the current node and its child nodes.

The following describes the way to obtain the information gain ratio:

In the embodiment of the present disclosure, the information gain ratio may be defined as the ratio of the information gain of the feature relative to the sample classification and the splitting information of the feature relative to the sample classification.

The information gain is set for every feature. For a feature t, the amount of information when the feature in the system and the amount of information when the system without the feature are both observed. The difference between the two cases is the amount of information that the feature brings to the system, that is, the information gain. The information gain represents a reducing degree of an uncertainty of the information of a category (cleanable or uncleanable) about a feature.

The splitting information is used to measure the breadth and uniformity of the feature splitting data (such as the sample set), and the splitting information can be the entropy of the feature.

Wherein, the step "acquiring the information gain ratio of the feature in the target sample set relative to the target sample set classification" may include:

Obtaining an information gain of the feature relative to the target sample se classification t;

Obtaining splitting information of the features relative to the target sample set classification;

Obtaining information gain ratios of the features relative to the target sample set classification according to the information gain and the splitting information.

In an embodiment, the information gain of the feature relative to the sample set classification may be obtained based on the empirical entropy of the sample classification and the conditional entropy of the feature relative to the sample set classification result. That is, the step "acquiring the information gain of the feature relative to the target sample set classification" may include:

Obtaining the empirical entropy of the target sample classification;

Obtaining conditional entropy of the feature for the target sample set classification result;

Obtaining information gains of the features relative to the target sample set classification according to the conditional entropy and the empirical entropy. Wherein, a first probability of occurrence of a positive sample in the sample set and a second probability of occurrence of a negative sample in the sample set may be obtained. The positive sample is a sample that is cleanable, and the negative sample is a sample that is not cleanable. The empirical entropy of the sample is obtained according to the first probability and the second probability.

In an embodiment, the information gain of the feature relative to the target sample set classification may be the difference between the empirical entropy and the conditional entropy. For example, for a sample set D {sample 1, sample 2 . . . sample i . . . sample n}, the sample includes a multi-dimensional feature, such as feature A. The information gain ratio of feature A for sample classification can be obtained by the following formula:

$$g_R(D, A) = \frac{g(D, A)}{H_A(D)}$$

Where $g_R$ (D, A) is the information gain ratio of the feature A relative to sample set D classification, g(D,A) is the information gain of the feature A relative to the sample classification, and $H_A(D)$ is the splitting information of the feature A, i.e., the entropy of feature A.

Among them, $g_R$ (D, A) can be obtained by the following formula:

$$g(D, A) = H(D) - H(D \mid A) = H(D) - \sum_{i=1}^{n} p_i H(D \mid A = A_i)$$

H(D) is the empirical entropy of the sample set D classification, H(D|A) is the conditional entropy of the feature A relative to the sample set D classification.

If the sample category is cleanable, the number of samples is j, and the number of samples that cannot be cleaned is n-j; at this time, the probability of occurrence of positive samples in the sample set D is p1=j/n, and the probability of occurrence of the negative samples in sample set D is p2=nj/n. Then, based on the following empirical entropy calculation formula, the empirical entropy H(D) of the sample classification is calculated:

$$H(D) = \sum_{i=1}^{2} p_i \log p_i$$

In the decision tree classification problem, the information gain is the difference of information of the decision tree between before and after the attribute selection. In this embodiment, the empirical entropy H(D) of the sample classification is:

$$H(D) = p_1 \log p_1 + p_2 \log p_2$$

In an embodiment, the sample set may be divided into several sub-sample sets according to feature A, and then the information entropy of each sub-sample set classification is obtained, and the probability of each feature value of the feature A appears in the sample set is obtained. The divided information entropy can be obtained according to the information entropy and the probability, that is, the conditional entropy of the feature Ai relative to the sample set classification result.

For example, for sample feature A, the conditional entropy of the sample feature A relative to the sample set D classification result can be calculated by the following formula:

$$H(D \mid A) = \sum_{i=1}^{n} p_i H(D \mid A = Ai)$$

Where n is the number of values of the feature A, that is, the number of types of the feature value. At this time, $p_1$ is the probability that the sample whose A feature is the i-th value appears in the sample set D, and Ai is the i-th value of A. (D|A=Ai) is the empirical entropy of the sub-sample set Di classification, and the A feature values of the samples in the sub-sample set Di are all the i-th values.

For example, taking the number of values of the feature A as 3, that is, A1, A2, and A3 as an example. At this time, the sample set D {sample 1, sample 2, sample i, . . . sample n} can be divided into three sub-sample set by feature A, that is D1 {sample 1, sample 2 . . . sample d} with feature values A1, D2 {sample d+1 . . . sample e} with feature values A2, D3{sample e+1 . . . sample n} with feature values A3, wherein d and e are positive integers and both less than n.

At this time, the conditional entropy of feature A relative to the classification result of sample set D is:

$$H(D|A)=p_1H(D|A=A1)+p_2H(D|A=A2)+p_3H(D|A=A3)$$

Where $p_1$=D1/D; $p_2$=D2/D; $p_1$=D3/D;

H(D|A1) is the information entropy of the subsample set D1 classification, that is, the empirical entropy, which can be calculated by the above formula of empirical entropy.

After obtaining the empirical entropy H(D|A) of the sample classification and the conditional entropy H(D|A) of the feature A relative to the sample set D classification result, the information gain of the feature A relative to the sample set D classification can be calculated, for example, by the formula:

$$g(D, A) = H(D) - H(D \mid A) = H(D) - \sum_{i=1}^{n} p_i H(D \mid A = A_i)$$

That is, the information gain of the feature A for the sample set D classification is: the difference between the empirical entropy H(D)) and the conditional entropy H(D|A) of the feature A relative to the sample set D classification result.

]The splitting information of the feature relative to the sample set classification is the entropy of the feature, which may be obtained by the probability of the distribution of the sample features based on the value of the feature in the target sample set. For example, $H_A(D)$ can be obtained by the following formula:

$$H_A(D) = -\sum_{i=1}^{n} \frac{|D_i|}{|D|} \log_2 \frac{|D_i|}{|D|};$$

i=1, 2, . . . , n is the value category of feature A, or the number of the category.

Where Di is the sample set of the sample set D when feature A is the i-th type.

Step 203, at a prediction time, multi-dimensional features of the application as prediction samples are collected.

wherein the prediction time can be set according to requirements, such as the current time.

For example, a multi-dimensional feature of an application can be acquired as a prediction sample at a predicted time.

In the embodiment of the present disclosure, the multi-dimensional features collected in the step 201 and step 203 are the same feature, for example, the duration of the application switched to the background; the duration of screen-off of the electronic device after the application switched to the background; the number of times the application enters the foreground; the time period during which the application is in the foreground; the manner in which the application enters the background.

Step 204, whether the application is cleanable is predicted according to the prediction samples and the decision tree model.

Specifically, the corresponding output result is obtained according to the predicted sample and the decision tree model, and whether the application can be cleaned is determined according to the output result. Among them, the output includes cleanable or uncleanable.

For example, the corresponding leaf node may be determined according to the feature of the predicted sample and the decision tree model, and the output of the leaf node is used as a predicted output result. For example, the current leaf node is determined according to a branch condition (i.e., the feature value of the partitioning feature) of the decision tree, and the output of the leaf node is taken as the prediction result. Since the output of the leaf node includes cleanable or uncleanable, it is now possible to determine whether the application can be cleaned according to the decision tree.

For example, after collecting the multi-dimensional feature of the current application at a current time, the corresponding leaf node may be found as an1 according to the branch condition of the decision tree in the decision tree shown in FIG. 5, and the output of the leaf node an1 is cleanable. Thus, the application is determined to be cleanable.

As shown from the above, the embodiment of the present disclosure collects the multi-dimensional feature of the application, to construct the sample set of the application, classifying the sample set according to the information gain ratio of the feature for the sample classification to construct a decision tree model of the application, an output of the decision tree model includes cleanable or uncleanable; the multi-dimensional features corresponding to the application are collected according to the prediction time as a prediction sample; whether the application a can be cleaned is predicted according to the prediction sample and the decision tree model to clean the cleanable application, thereby realizing automatically cleaning application, improving the smooth running of electronic devices and reducing power consumption.

Further, the embodiment of the present disclosure can make the cleaning of the corresponding application more personalized and intelligent, because each of the samples in the sample set includes a plurality of feature information that reflects the behavior of using habits of a user about the application.

Further, implementing the application clean prediction based on the decision tree prediction model can improve the accuracy of the user behavior prediction, thereby improving the accuracy of the cleanup.

Figure 6:
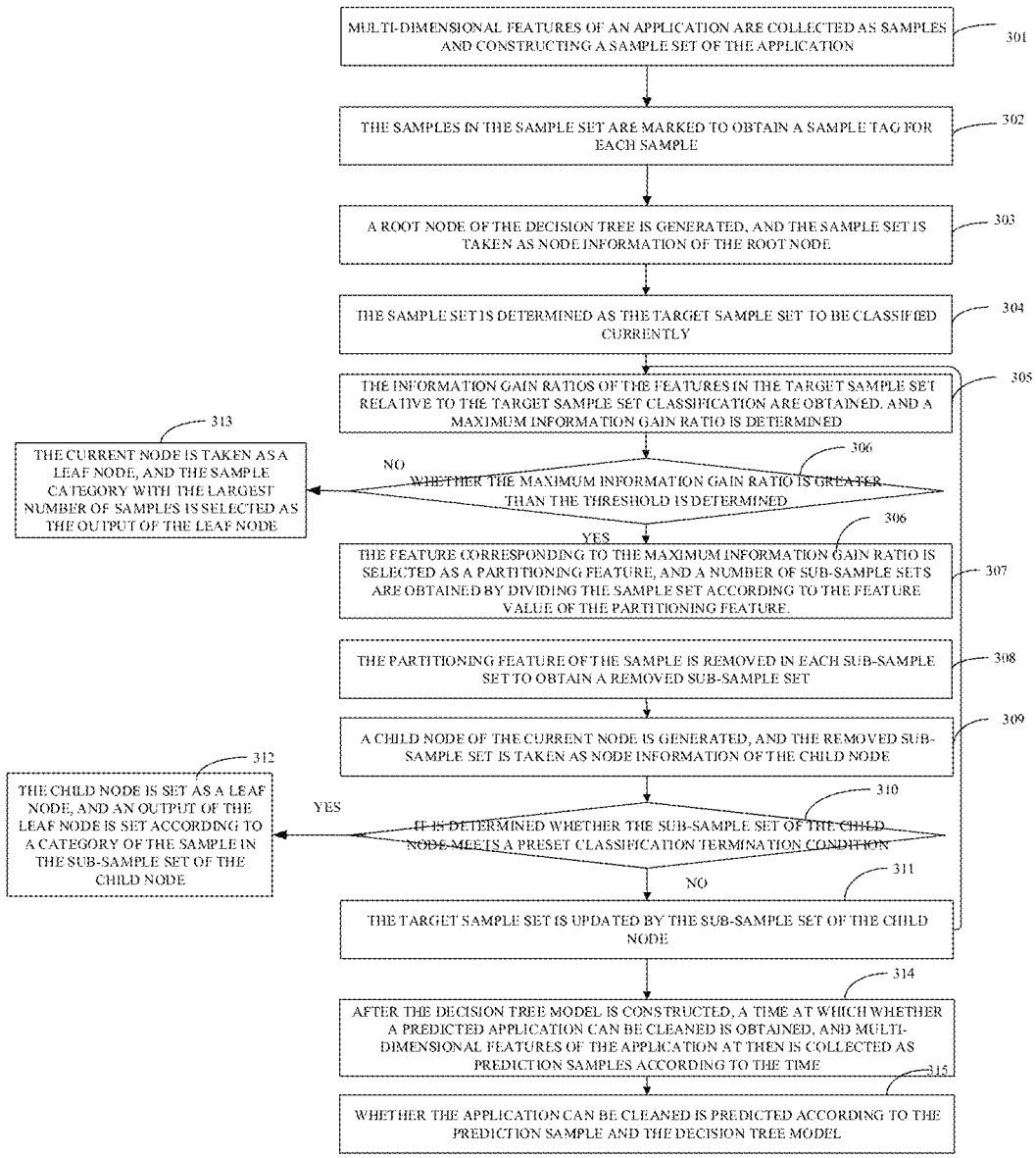
FIG. 6 is another schematic flowchart of an application cleaning method provided by an embodiment of the present disclosure.

The cleaning method of the present disclosure will be further described below based on the method described in the above embodiments. Referring to FIG. 6, the application cleaning method may include:

Step 301, multi-dimensional features of an application are collected as samples and constructing a sample set of the application.

The multi-dimensional feature information of the application has a dimension of a certain length, and the parameters in each dimension correspond to a feature information of the application, that is, the multi-dimensional feature information is composed of a plurality of feature information. The plurality of feature information may include feature information related to the application itself, for example, the duration of the application cutting into the background; the duration of the electronic device when the application is cut into the background; the number of times the application enters the foreground; the time when the application is in the foreground; the application enters the background mode is, for example, switched by the home button (home button), switched back by the return button, switched by other applications, etc.; the type of application includes level one (common application), level two (other applications), and the like. The plurality of feature information may further include related feature information of the electronic device where the application is located, for example, the time when the electronic device is off, the time of the bright screen, the current power, the wireless network connection status of the electronic device, whether the electronic device is in the charging state, or the like. The plurality of feature information may further include related feature information of the electronic device in which the application is located, for example, a screen-off time of the electronic device, a screen-on time of the electronic device, a current power, a wireless network connection status of the electronic device, whether the electronic device is in a charging state, or the like.

The sample set of the application may include multiple samples collected at a preset frequency during the historical time period. The historical time period may be, for example, the past 7 days or 10 days; the preset frequency may be, for example, collected once every 10 minutes, or once every half hour. It can be understood that datum of the multi-dimensional feature of the application collected at one time constitutes one sample and multiple samples constitute a sample set.

A specific sample may be as shown in Table 1 below, which includes feature information of multi-dimensions. It should be noted that the feature information shown in Table 1 is only an example. In practice, the number of feature information included in one sample may be more than or less than the number of information shown in Table 1. The specific feature information may be different from that shown in Table 1, which is not specifically limited herein.

TABLE 1

| Dimension | Feature information |
| --- | --- |
| 1 | Current time period |
| 2 | Current date category (working days, rest days) |
| 3 | Previous situational application name |
| 4 | The name of situational application before the previous situational application |
| 5 | Current wireless network status, such as Wi-Fi connection status |
| 6 | When the wireless network is connected, the identification information of the wireless network, such as SSID/BSSID of Wi-Fi |
| 7 | The duration of the application in the background |
| 8 | A screen-off time of the electronic device, for example the screen-off time during the application is running background |
| 9 | A current power |
| 10 | Current charging state |
| 11 | Current plug-in status of the earphone |
| 12 | Category of the application |
| 13 | The way of switching application, for example, the way of switching the application to the background |

Step 302, the samples in the sample set are marked to obtain a sample tag for each sample.

Since the implementation of the present disclosure is to predict whether the application can be cleaned, the labeled sample tag includes cleanable and uncleanable, that is, the sample category includes cleanable and uncleanable.

In addition, each sample in the sample set can be marked according to the user's historical usage habits of the application. For example, after the application enters the background for 30 minutes, the user closes the application and this sample is marked as "cleanable"; for example, after the application enters the background and running in the background for 3 minutes, the user switch the application to the foreground and this sampler is marked as "uncleanable". Specifically, the value "1" can be used to indicate "cleanable", the value "0" is used to mean "uncleanable", and vice versa.

Step 303, a root node of the decision tree is generated, and the sample set is taken as node information of the root node.

Figure 3:
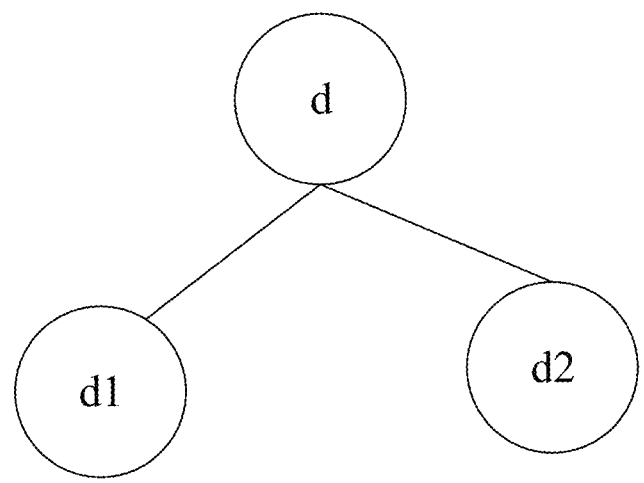
FIG. 3 is a schematic diagram of a decision tree provided by an embodiment of the present disclosure.

For example, referring to FIG. 3, for a sample set A {sample 1, sample 2 . . . sample i . . . sample n}, a root node a of a decision tree is first generated, and the sample set A is taken as the node information of the root node a.

Step 304, the sample set is determined as the target sample set to be classified currently.

That is, the sample set of the root node is determined to be the current target sample set to be classified.

Step 305, the information gain ratios of the features in the target sample set relative to the target sample set classification are obtained, and a maximum information gain ratio is determined.

For example, for a sample set D, the information gain ratio $g_R(D,A)1, g_R(D,A)2 \ldots g_R(D,A)m$ of each feature relative to the sample set classification is calculated, and the maximum information gain $g_R(D,A)m$ is selected, for example, $g_R(D,A)I$ is the maximum of the information gain ratio.

Wherein the information gain ratios of the features relative to the sample set classification, an obtaining method is provided as follows.

Obtaining empirical entropies of the target sample classification; obtaining conditional entropies of the features for the target sample set classification result; obtaining information gains of the features relative to the target sample set classification according to the conditional entropies and the empirical entropies.

Obtaining splitting information of the features relative to the sample set classification, that is, the entropies of the features relative to the sample classification;

Obtaining a ratio of the information gain and the entropy to acquire an information gain ratio of each of the features relative to the sample classification.

For example, for the sample set D, {sample 1, sample 2, . . . , sample n}, the sample includes a multi-dimensional feature, such as feature A. The information gain ratio of feature A relative to the sample classification can be obtained by the following formula:

$$g_R(D, A) = \frac{g(D, A)}{H_A(D)}$$

Where, g(D, A) is the information gain of feature A relative to sample classification, and $H_A(D)$ is the splitting information of the feature A, i.e., the entropy of feature A.

Where, g(D, A) can be obtained by the following formula:

$$g(D, A) = H(D) - H(D \mid A) = H(D) - \sum_{i=1}^{n} p_i H(D \mid A = A_i)$$

H(D) is the empirical entropy of the sample set D classification, H(D|A) is the conditional entropy of the feature A relative to the sample set D classification.

If the sample category is cleanable, the number of samples is j, and the number of samples that cannot be cleaned is n-j; at this time, the probability of occurrence of positive samples in the sample set D is p1=j/n, and the probability of occurrence of the negative samples in sample set D is p2=nj/n. Then, based on the following empirical entropy calculation formula, the empirical entropy H(D) of the sample classification is calculated:

$$H(D) = \sum_{i=1}^{2} p_i \log p_i$$

In the decision tree classification problem, the information gain is the difference of information of the decision tree between before and after the attribute selection. In this embodiment, the empirical entropy H(D) of the sample classification is:

$$H(D) = p_1 \log p_1 + p_2 \log p_2$$

In an embodiment, the sample set may be divided into several sub-sample sets according to feature A, and then the information entropy of each sub-sample set classification is obtained, and the probability of each feature value of the feature A appears in the sample set is obtained. The divided information entropy can be obtained according to the information entropy and the probability, that is, the conditional entropy of the feature Ai relative to the sample set classification result.

For example, for the feature A, the conditional entropy of the feature A relative to the sample set D classification result can be calculated by the following formula:

$$H(D \mid A) = \sum_{i=1}^{n} p_i H(D \mid A = Ai)$$

Where n is the number of values of the feature A, that is, the number of types of the feature value. At this time, $p_1$ is the probability that the sample whose A feature is the i-th value appears in the sample set D, and Ai is the i-th value of A. (D|A=Ai) is the empirical entropy of the sub-sample set Di classification, and the A feature values of the samples in the sub-sample set Di are all the i-th values.

For example, taking the number of values of the feature A as 3, that is, A1, A2, and A3 as an example. At this time, the sample set D{sample 1, sample 2, sample i, . . . sample n} can be divided into three sub-sample set by feature A, that is D1 {sample 1, sample 2 . . . sample d} with feature values A1, D2 {sample d+1 . . . sample e} with feature values A2, D 3 {sample e+1 . . . sample n} with feature values A3, wherein d and e are positive integers and both less than n.

At this time, the conditional entropy of feature A relative to the classification result of sample set D is:

$$H(D|A) = p_1 H(D|A=A1) + p_2 H(D|A=A2) + p_3 H(D|A=A3)$$

Where $p_1$=D1/D; $p_2$=D2/D; $p_1$=D3/D;

H(D|A1) is an information entropy of the subsample set D1 classification, that is, the empirical entropy, which can be calculated by the above formula of empirical entropy.

After obtaining the empirical entropy H(D|A) of the sample classification and the conditional entropy H(D|A) of the feature A relative to the sample set D classification result, the information gain of the feature A relative to the sample set D classification can be calculated, for example, by the formula:

$$g(D, A) = H(D) - H(D \mid A) = H(D) - \sum_{i=1}^{n} p_i H(D \mid A = A_i)$$

That is, the information gain of the feature A for the sample set D classification is: the difference between the empirical entropy H(D)) and the conditional entropy H(D|A) of the feature A relative to the sample set D classification result.

The splitting information of the feature relative to the sample set classification is the entropy of the feature, which may be obtained by the probability of the distribution of the sample features based on the value of the feature in the target sample set. For example, $H_A$ (D) can be obtained by the following formula:

$$H_A(D) = -\sum_{i=1}^{n} \frac{|D_i|}{|D|} \log_2 \frac{|D_i|}{|D|};$$

i=1, 2, . . . , n is the value category of feature A, or the number of the category.

Where Di is the sample set of the sample set D when feature A is the i-th type.

Step 306, whether the maximum information gain ratio is greater than the threshold is determined. If yes, continue the step 302. If not, continue the step 313.

For example, whether the maximum information gain ratio $g_R$ (D, A) is larger than a preset threshold E, the threshold E may be set according to an actual demand.

Step 307, the feature corresponding to the maximum information gain ratio is selected as a partitioning feature, and a number of sub-sample sets are obtained by dividing the sample set according to the feature value of the partitioning feature.

For example, the sample set may be divided into the sub-sample sets according to the number of the category of the feature value. The number of the sub-sample sets are the same as the number of the category of the feature value. For example, a sample with the same feature value in the sample set can be divided into the same sub-sample set. For example, the feature values of the partitioning features include: 0, 1, and 2, then, the samples whose feature values are 0 can be classified into one category, and the samples with the feature value 1 are classified into one category, and the feature values 2 are classified into one category.

Step 308, the partitioning feature of the sample is removed in each sub-sample set to obtain a removed sub-sample set.

For example, when the number of types of the partitioning feature is 2, the sample set D may be divided into D1 {sample 1, sample 2 . . . sample k}, and D2 {sample k+1 . . . sample n}. Then, the partitioning feature Ag may be removed in the sub-sample set D1 and the sub-sample set D2, that is, A-Ag.

Step 309, a child node of the current node is generated, and the removed sub-sample set is taken as node information of the child node.

Wherein, on sub-sample set corresponds to a child node. For example, referring to FIG. 3, a child node d1 and a child node d2 of a root node d are generated, and the sub-sample set D1 is set as node information of the child node d1, and the sub-sample set D2 is set as node information of the child node d2.

In one embodiment, as shown in FIG. 5, a partition feature value corresponding to a child node may be set on the path of the current node and its child nodes, so that subsequent application prediction is facilitated.

Step 310, it is determined whether the sub-sample set of the child node meets a preset classification termination condition, and if yes, a step 311 is performed, and if no, a step 312 is performed.

The preset classification termination condition may be set according to actual requirements. When the child node meets the preset classification termination condition, the current child node is used as a leaf node, and the sample set corresponding to the child node is stopped for word segmentation; when the child node is not satisfied the preset classification termination condition is, the classification of the sample set corresponding to the child node is continued.

For example, the preset classification termination condition may include: the number of categories of the samples in the removed sub-sample set corresponding to the child node is 1, that is, the sample in the sample set of the child node has only one category.

Taking the child node d1 as an example. It is determined whether the child node meets the preset classification termination condition. If yes, the current child node d1 is used as a leaf node, and the leaf node output is set according to the category of the sample in the subsample set corresponding to the child node d1.

Step 311, the target sample set is updated by the sub-sample set of the child node and return to the step 305.

When the child node does not meet the preset classification termination condition, the above-mentioned sub-sample set corresponding to the child node is continued to be classified according to the information gain classification method. For example, a child node d2 can be used as an example to calculate the information gain ratio $g_R(D,A)$ of each features of the A2 sample set relative to the sample classification, and select a maximum information gain ratio $g_R(D,A)max$. When the maximum information gain ratio $g_R(D,A)max$ is greater than the preset threshold E, the feature corresponding to the information gain ratio $g_R(D, A)$ is the partitioning feature Ag (such as the feature Ai+1), and the D2 is divided into several sub-sample sets based on the partitioning feature Ag, for example, the D2 can be divided into the sub-sample sets D21, D22, and D23. Then, the partitioning features Ag in each subsample sets D21, D22, and D23 are removed, and the child nodes d21, d22, and d23 of the current node d2 are generated. The sample sets D21, D22, and D23 with removed partitioning features Ag are respectively taken as the node information of the child node d21, d22, and d23, respectively.

Step 312, the child node is set as a leaf node, and an output of the leaf node is set according to a category of the sample in the sub-sample set of the child node.

For example, the preset classification termination condition may include: the number of categories of the samples in the removed sub-sample set corresponding to the child node is 1, that is, the sample in the sample set of the child node has only one category.

At this time, if the child node meets the preset classification termination condition, the category of the sample in the sub-sample set is taken as the output of the leaf node. For example, there is only a sample with the category "cleanable" in the removed sub-sample set, then "cleanable" can be used as the output of the leaf node.

Step 313, the current node is taken as a leaf node, and the sample category with the largest number of samples is selected as the output of the leaf node.

Among them, the sample categories include cleanable and uncleanable.

For example, when the sub-sample set D1 of the child node d1 is classified, if the maximum information gain is smaller than the preset threshold, at this time, the sample category having the largest number of samples in the sub-sample set D1 can be used as the output of the leaf node. If the number of "uncleanable" samples is the largest, "uncleanable" can be used as the output of leaf node a1.

Step 314, after the decision tree model is constructed, a time at which whether a predicted application can be cleaned is obtained, and multi-dimensional features of the application at then is collected as prediction samples according to the time.

Among them, a time at which whether a predicted application can be cleaned may include a current time, or other time.

Step 315, whether the application can be cleaned is predicted according to the prediction sample and the decision tree model.

For example, a corresponding leaf node may be determined according to the features of the predicted sample and the decision tree model, and the output of the leaf node is output as a prediction result. For example, the current leaf node is determined according to a branch condition of the decision tree (i.e., the feature value of the partitioning feature) by using the features of the predicted sample, and the output of the leaf node is taken as the prediction result. Since the output of the leaf node includes cleanable or uncleanable, it is now possible to determine whether the application can be cleaned according to the decision tree.

For example, after collecting the multi-dimensional feature of the application at current time, the corresponding leaf node can be found as an2 according to the branch condition of the decision tree in the decision tree shown in FIG. 5, and the output of the leaf node an2 is uncleanable, thus the application is not cleanable.

In a specific example, whether a number of applications running in the background can be cleaned may be predicted by a pre-built decision tree model. As shown in Table 2, it is determined that an application App1 and an application App3 running in the background can be cleaned, while an application App2 is maintained with its status of running in the background unchanged.

TABLE 2

| Application | Prediction Result |
|---|---|
| Application App1 | Cleanable |
| Application App2 | Uncleanable |
| Application App3 | Cleanable |

As can be seen from the above, the embodiment of the present disclosure collects multi-dimensional features of the application as samples, and constructs a sample set of the application; classifies the sample set according to the information gain ratio of the sample classification to construct an application decision tree model, and a decision tree. The output of the model includes cleanable or uncleanable; the multi-dimensional features corresponding to the application are collected as prediction samples according to the prediction time; whether the application can be cleaned according to the prediction sample and the decision tree model, the application that can be cleaned is cleaned up, thereby realizing the application. Automatic cleaning improves the smooth running of electronic equipment and reduces power consumption.

Further, the embodiment of the present disclosure can make the cleaning of the corresponding application more personalized and intelligent, because each of the samples in the sample set includes a plurality of feature information that reflects the behavior of using habits of a user about the application.

Further, implementing the application clean prediction based on the decision tree prediction model can improve the accuracy of the user behavior prediction, thereby improving the accuracy of the cleanup.

The embodiment of the present disclosure further provides an application cleaning device, including:

a first collecting unit, configured to collect multi-dimensional features of an application as samples, and constructing a sample set of the application;

a classifying unit, configured to classify the sample set according to information gain ratios of the features relative to a sample classification to construct a decision tree model of the application, wherein an output of the decision tree model includes cleanable or not cleanable;

a second collecting unit, configured to collect the multi-dimensional features of the application as prediction samples according to a prediction time; and a predicting unit configured to predict whether the application is cleanable according to the prediction samples and the decision tree model.

In some embodiments, the classifying unit comprises:

a first node generating subunit, configured to generate a root node of a decision tree, and take the sample set as node information of the root node; and determine the sample set of the root node as a target sample set to be classified currently a gain ratio obtaining subunit, configured to obtain information gain ratios of the features in the target sample set relative to the target sample set classification;

a feature determining subunit, configured to select a current partitioning feature from the features according to the information gain ratios;

a classifying subunit, configured to divide the target sample set according to the partitioning feature to obtain a plurality of sub-sample sets;

a second node generating subunit, configured to remove the partitioning feature of the sample in each of the sub-sample sets to obtain removed sub-sample sets; and generate a child node of a current node, and taking one of the removed sub-sample sets as node information of the child node;

a determining subunit, configured to determine whether the child node meets a preset classification termination condition;

when the child node does not meet a preset classification termination condition, update the target sample set by the removed sub-sample set, and return to obtain information gain ratios of the features in the target sample set relative to the target sample set classification; and when the child node meets the preset classification termination condition, take the child node as a leaf node, and set an output of the leaf node according to a category of the sample in the corresponding removed sub-sample set, and the category of the sample includes cleanable or uncleanable.

In some embodiments, the classification subunit is configured to:

obtain feature values of the partitioning feature in the target sample set;

divide the target sample set according to the feature values.

In some embodiments, the feature determining subunit is configured to:

select a maximum target information gain ratio in the information gain ratios;

determine whether the target information gain ratio is larger than a preset threshold;

when the target information gain ratio is larger than a preset threshold, determine a feature corresponding to the target information gain ratio as the current partitioning feature.

In some embodiments, the gain ratio obtaining subunit is configured to:

obtain information gains of the features relative to the target sample set classification;

obtain splitting information of the features relative to the target sample set classification; and obtain the information gain ratios of the features relative to the target sample set classification according to the information gains and the splitting information.

In some embodiments, the feature determining subunit is further configured to: when the target information gain ratio is not larger than the preset threshold, take the current node as a leaf node, and take the category of which the number of the sample is the largest as the output of the leaf node.

In some embodiments, the determining subunit is configured to:

determine whether the number of the category of the samples in the removed sub-sample set corresponding to the child node is a preset number;

when the number of categories of the samples in the removed sub-sample set corresponding to the child node is a preset number, determine that the child node meets the preset classification termination condition.

In some embodiments, the gain ratio obtaining subunit is configured to:

obtain information gains of the features relative to the target sample set classification;

obtain splitting information of the features relative to the target sample set classification; and obtain the information gain ratios of the features relative to the target sample set classification according to the information gains and the splitting information.

In some embodiments, the gain ratio obtaining subunit is configured to:

calculate the information gain ratios of the features relative to the target sample set classification by the following formula:

$$g_R(D, A) = \frac{g(D, A)}{H_A(D)}$$

wherein $g_R(D,A)$ is the information gain ratio of a feature A relative to a sample set D classification, $g(D,A)$ is the information gain of the feature A relative to the sample classification, and $H_A(D)$ is the splitting information of the feature A;

$g(D,A)$ can be calculated by the following formula:

$$g(D, A) = H(D) - H(D \mid A) = H(D) - \sum_{i=1}^{n} p_i H(D \mid A = A_i)$$

wherein $H(D)$ is the empirical entropy of the sample set D classification, $H(D|A)$ is the conditional entropy of the feature A relative to the sample set D classification, and $p_i$ is the probability of a sample whose feature A taking the i-th value in the sample set D, n and i are both positive integers larger than zero.

Figure 7:
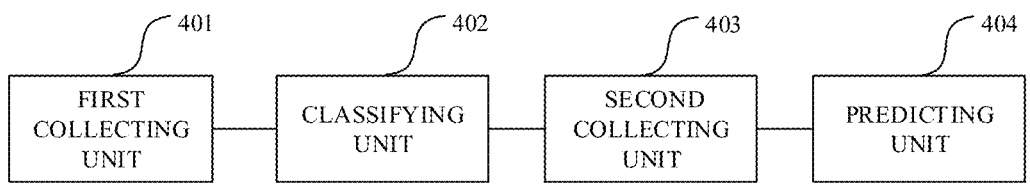
FIG. 7 is a schematic structural diagram of an application cleaning device according to an embodiment of the present disclosure.
Figure 8:
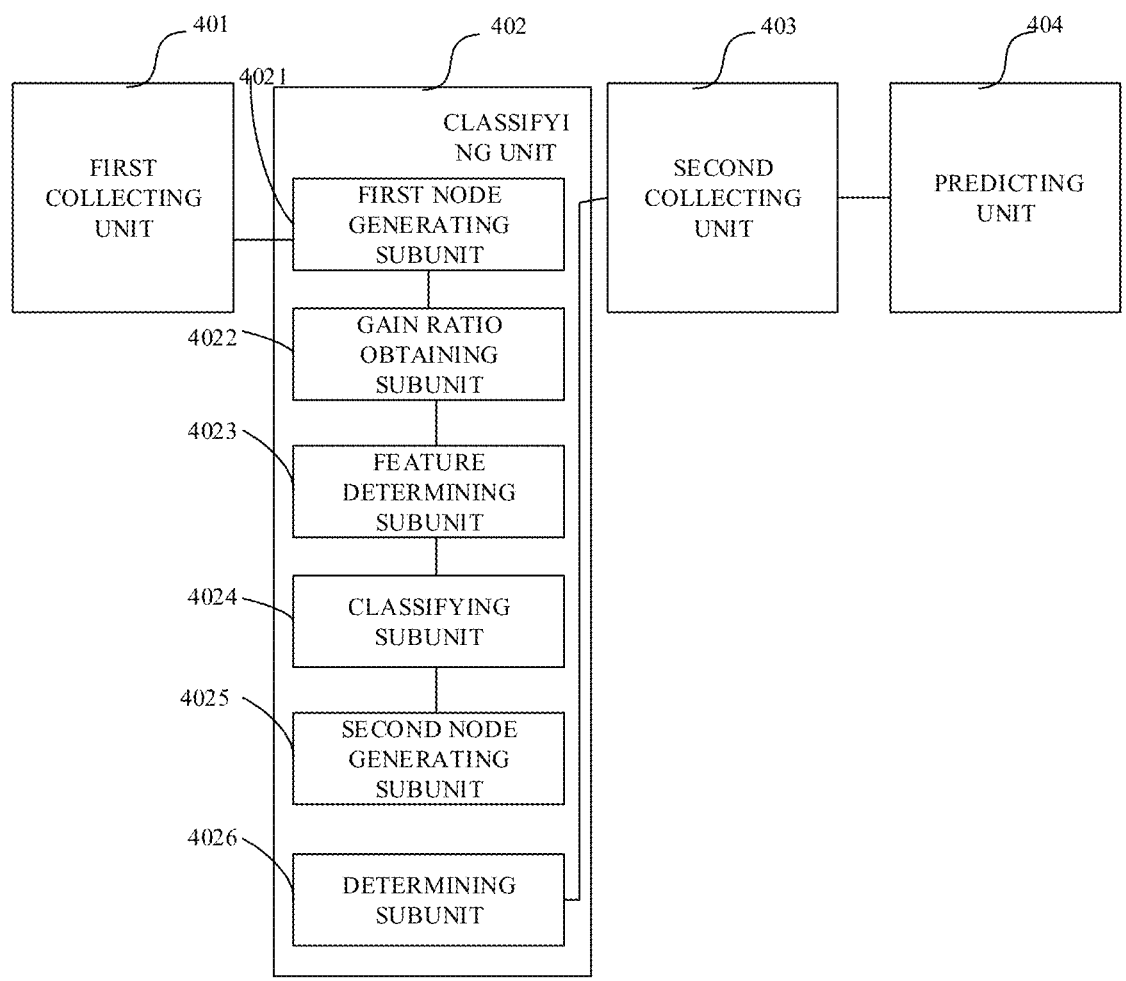
FIG. 8 is another schematic structural diagram of an application cleaning device according to an embodiment of the present disclosure.

An application cleaning device is also provided in an embodiment. Referring to FIG. 7. FIG. 7 is a schematic structural diagram of an application cleaning device according to an embodiment of the present disclosure. The application cleaning device is applied to an electronic device, and the application cleaning device includes a first collecting unit 401, a classifying unit 402, a second collecting unit 403, and a predicting unit 404, as follows:

a first collecting unit 401, configured to collect multi-dimensional features of an application as samples, and constructing a sample set of the application;

a classifying unit 402, configured to classify the sample set according to information gain ratios of the features relative to a sample classification to construct a decision tree model of the application, wherein an output of the decision tree model includes cleanable or not cleanable;

a second collecting unit 403, configured to collect the multi-dimensional features of the application as prediction samples according to a prediction time; and a predicting unit 404, configured to predict whether the application is cleanable according to the prediction samples and the decision tree model.

In some embodiments, the classifying unit 402 comprises:

a first node generating subunit 4021, configured to generate a root node of a decision tree, and take the sample set as node information of the root node; and determine the sample set of the root node as a target sample set to be classified currently a gain ratio obtaining subunit 4022, configured to obtain information gain ratios of the features in the target sample set relative to the target sample set classification;

a feature determining subunit 4023, configured to select a current partitioning feature from the features according to the information gain ratios;

a classifying subunit 4024, configured to divide the target sample set according to the partitioning feature to obtain a plurality of sub-sample sets;

a second node generating subunit 4025, configured to remove the partitioning feature of the sample in each of the sub-sample sets to obtain removed sub-sample sets; and generate a child node of a current node, and taking one of the removed sub-sample sets as node information of the child node;

a determining subunit 4026, configured to determine whether the child node meets a preset classification termination condition; when the child node does not meet a preset classification termination condition, update the target sample set by the removed sub-sample set, and trigger the gain ratio obtaining subunit 4022 to obtain information gain ratios of the features in the target sample set relative to the target sample set classification; and when the child node meets the preset classification termination condition, take the child node as a leaf node, and set an output of the leaf node according to a category of the sample in the corresponding removed sub-sample set, and the category of the sample includes cleanable or uncleanable.

The classification subunit 4024 is configured to: obtain feature values of the partitioning feature in the target sample set; divide the target sample set according to the feature values.

The feature determining subunit 4023 is configured to select a maximum target information gain ratio in the information gain ratios; determine whether the target information gain ratio is larger than a preset threshold; when the target information gain ratio is larger than a preset threshold, determine a feature corresponding to the target information gain ratio as the current partitioning feature.

In some embodiments, the gain ratio obtaining subunit 4022 is configured to: obtain information gains of the features relative to the target sample set classification; obtain splitting information of the features relative to the target sample set classification; and obtain the information gain ratios of the features relative to the target sample set classification according to the information gains and the splitting information.

For example, the gain ratio obtaining subunit 4022 is configured to:

obtain information gains of the features relative to the target sample set classification;

obtain splitting information of the features relative to the target sample set classification; and obtain the information gain ratios of the features relative to the target sample set classification according to the information gains and the splitting information.

In some embodiments, the determining subunit 4026 is configured to determine whether the number of the category of the samples in the removed sub-sample set corresponding to the child node is a preset number;

when the number of categories of the samples in the removed sub-sample set corresponding to the child node is a preset number, determine that the child node meets the preset classification termination condition.

In some embodiments, the feature determining subunit 4023 is further configured to: when the target information gain ratio is not larger than the preset threshold, take the current node as a leaf node, and take the category of which the number of the sample is the largest as the output of the leaf node.

The steps performed by each unit in the application cleaning device may refer to the method steps described in the foregoing method embodiments. The application cleaning device can be integrated in an electronic device such as a mobile phone, a tablet computer, or the like.

In the specific implementation, the foregoing various units may be implemented as an independent entity, or may be implemented in any combination, and may be implemented as the same or a plurality of entities. For the specific implementation of the foregoing units, refer to the foregoing embodiments, and details are not described herein again.

The term "module", "unit" as used herein may be taken to mean a software object that is executed on the computing system. The different components, modules, engines, and services described herein can be considered as implementation objects on the computing system. The apparatus and method described herein may be implemented in software, and may of course be implemented in hardware, all of which are within the scope of the present disclosure.

The terms "first," "second," and "third," etc. in this application are used to distinguish different objects and are not intended to describe a particular order. Furthermore, the terms "comprise" and "include" are intended to cover a non-exclusive inclusion. For example, a process, method, system, product, or device that comprises a series of steps or modules is not limited to the listed steps or modules, but some embodiments also include steps or modules not listed, or some embodiments, other steps or modules inherent to these processes, methods, products or devices are also included.

As can be seen from the above, the application cleaning device of the present embodiment can collect multi-dimensional features of an application as samples, and constructing a sample set of the application by a first collecting unit 401, classify the sample set according to information gain ratios of the features relative to a sample classification to construct a decision tree model of the application, wherein an output of the decision tree model includes cleanable or not cleanable by a classifying unit 402, collect the multi-dimensional features of the application as prediction samples according to a prediction time by a second collecting unit 403, and predict whether the application is cleanable according to the prediction samples and the decision tree model by a predicting unit 404, thus the application that can be cleaned is cleaned up, thereby realizing the application. Automatic cleaning improves the smooth running of electronic equipment and reduces power consumption.

Figure 9:
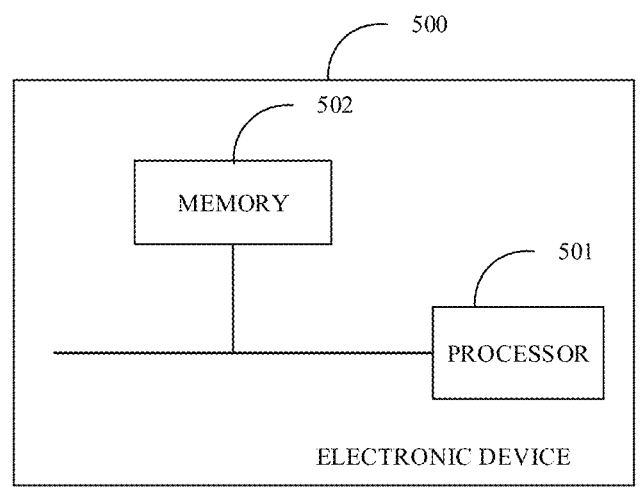
FIG. 9 is a schematic structural diagram of an electronic device according to an embodiment of the present disclosure.

An embodiment of the present disclosure further provides an electronic device. Referring to FIG. 9, the electronic device 500 includes a processor 501 and a memory 502. The processor 501 is electrically connected to the memory 502.

The processor 501 is a control center of the electronic device 500 that connects various portions of the entire electronic device using various interfaces and lines, by running or loading a computer program stored in the memory 502, and recalling data stored in the memory 502, The various functions of the electronic device 500 are performed and the data is processed to perform overall monitoring of the electronic device 500.

The memory 502 can be used to store software programs and modules, and the processor 501 executes various functional applications and data processing by running computer programs and modules stored in the memory 502. The memory 502 may mainly include a storage program area and a storage data area, wherein the storage program area may store an operating system, a computer program required for at least one function (such as a sound playing function, an image playing function, etc.), and the like; the storage data area may be stored according to Data created by the use of electronic devices, etc. Moreover, memory 502 can include high-speed random-access memory, and can also include non-volatile memory, such as at least one magnetic disk storage device, flash memory device, or other volatile solid-state storage device. Accordingly, memory 502 can also include a memory controller to provide processor 501 access to memory 502.

In the embodiment of the present disclosure, the processor 501 in the electronic device 500 loads the instructions corresponding to the process of one or more computer programs into the memory 502 according to the following steps and is stored in the memory 502 by the processor 501. The computer program in which to implement various functions, as follows:

collecting multi-dimensional features of an application as samples, and constructing a sample set of the application;

classifying the sample set according to information gain ratios of the features relative to a sample classification to construct a decision tree model of the application, wherein an output of the decision tree model includes cleanable or not cleanable;

collecting, at a prediction time, multi-dimensional features of the application as prediction samples; and predicting whether the application is cleanable according to the prediction samples and the decision tree model.

In some embodiments, when the sample set is classified according to the information gain of the feature classification for the sample to construct the decision tree model of the application, the processor 501 may specifically perform the following steps:

generating a root node of a decision tree, and taking the sample set as node information of the root node;

determining the sample set of the root node as a target sample set to be classified currently;

obtaining information gain ratios of the features in the target sample set relative to the target sample set classification;

selecting a current partitioning feature from the features according to the information gain ratios;

dividing the target sample set according to the partitioning feature to obtain a plurality of sub-sample sets;

removing the partitioning feature of the sample in each of the sub-sample sets to obtain removed sub-sample sets;

generating a child node of a current node, and taking one of the removed sub-sample sets as node information of the child node;

determining whether the child node meets a preset classification termination condition;

when the child node does not meet a preset classification termination condition, updating the target sample set by the removed sub-sample set, and returning to perform the step of obtaining information gain ratios of the features in the target sample set relative to the target sample set classification; and when the child node meets the preset classification termination condition, taking the child node as a leaf node, and setting an output of the leaf node according to a category of the sample in the corresponding removed sub-sample set, and the category of the sample includes cleanable or uncleanable.

In some embodiments, when the target sample set is divided according to the dividing feature, the processor 501 may specifically perform the following steps:

obtaining feature values of the partitioning feature in the target sample set;

dividing the target sample set according to the feature values.

In some embodiments, when selecting the current partitioning feature from the features according to the information gain ratio selection, the processor 501 may specifically perform the following steps:

selecting a maximum target information gain ratio in the information gain ratios;

determining whether the target information gain ratio is larger than a preset threshold;

when the target information gain ratio is larger than a preset threshold, determining a feature corresponding to the target information gain ratio as the current partitioning feature.

In some embodiments, the processor 501 may further perform the following steps:

when the target information gain ratio is not larger than the preset threshold, taking the current node as a leaf node, and taking the category of which the number of the sample is the largest as the output of the leaf node.

In some embodiments, when obtaining the information gains of the feature relative to the sample set classification in the target sample set, the processor 501 may specifically perform the following steps:

obtaining information gains of the features relative to the target sample set classification;

obtaining splitting information of the features relative to the target sample set classification;

obtaining the information gain ratios of the features relative to the target sample set classification according to the information gains and the splitting information. It can be seen from the above that the electronic device of the embodiment of the present disclosure collects multi-dimensional features of the application as samples, and constructs a sample set of the application; classifies the sample set according to the information gain ratio of the sample classification to construct an application decision tree model, and a decision tree. The output of the model includes cleanable or uncleanable; the multi-dimensional features corresponding to the application are collected as prediction samples according to the prediction time; whether the application can be cleaned according to the prediction sample and the decision tree model, the application that can be cleaned is cleaned up, thereby realizing the application. Automatic cleaning improves the smooth running of electronic equipment and reduces power consumption.

Figure 10:
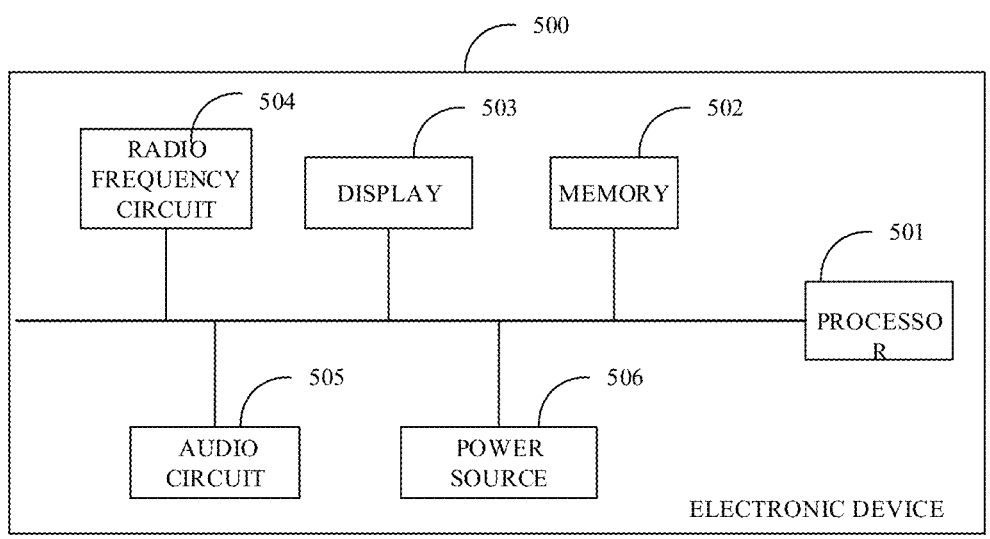
FIG. 10 is another schematic structural diagram of an electronic device according to an embodiment of the present disclosure.

Referring to FIG. 10 together, in some embodiments, the electronic device 500 may further include: a display 503, a radio frequency circuit 504, an audio circuit 505, and a power source 506. The display 503, the radio frequency circuit 504, the audio circuit 505, and the power source 506 are electrically connected to the processor 501, respectively.

The display 503 can be used to display information entered by a user or information provided to a user, as well as various graphical user interfaces, which can be composed of graphics, text, icons, video, and any combination thereof. The display 503 can include a display panel. In some embodiments, the display panel can be configured in the form of a liquid crystal display (LCD) or an organic light-emitting diode (OLED).

The radio frequency circuit 504 can be used to transmit and receive radio frequency signals to establish wireless communication with a network device or other electronic device through wireless communication, and to transmit and receive signals with a network device or other electronic device.

The audio circuit 505 can be used to provide an audio interface between a user and an electronic device through a speaker or a microphone.

The power source 506 can be used to power various components of the electronic device 500. In some embodiments, the power source 506 can be logically coupled to the processor 501 through a power management system to enable functions such as managing charging, discharging, and power management through the power management system.

Although not shown in FIG. 10, the electronic device 500 may further include a camera, a Bluetooth module, and the like, and details are not described herein.

The embodiment of the present disclosure further provides a storage medium, where the storage medium stores a computer program, and when the computer program runs on a computer, causes the computer to perform an application cleaning method in any of the above embodiments, such as: applying the multi-dimensional feature as a sample, and constructing a sample set of the application; classifying the sample set according to the information gain ratio of the feature classification for the sample to construct a decision tree model of the application, a decision tree model The output includes cleanable or uncleanable; the multi-dimensional feature corresponding to the application is collected as a prediction sample according to the predicted time; and the application is predicted to be cleanable according to the predicted sample and the decision tree model.

In the embodiment of the present disclosure, the storage medium may be a magnetic disk, an optical disk, a read only memory (ROM), or a random-access memory (RAM).

In the above embodiments, the descriptions of the various embodiments are different, and the details that are not detailed in a certain embodiment can be referred to the related descriptions of other embodiments.

It should be noted that, in the application cleaning method of the embodiment of the present disclosure, a general tester in the art can understand all or part of the process of implementing the application cleaning method in the embodiment of the present disclosure, which can be completed by controlling the related hardware through a computer program. The computer program may be stored in a computer readable storage medium, such as in a memory of the electronic device, and executed by at least one processor in the electronic device, and may include, for example, an application cleaning method during execution. The flow of the embodiment. The storage medium may be a magnetic disk, an optical disk, a read only memory, a random-access memory, or the like.

For the application cleaning device of the embodiment of the present disclosure, each functional module may be integrated into one processing chip, or each module may exist physically separately, or two or more modules may be integrated into one module. The above integrated modules can be implemented in the form of hardware or in the form of software functional modules. The integrated module, if implemented in the form of a software functional module and sold or used as a standalone product, may also be stored in a computer readable storage medium, such as a read only memory, a magnetic disk or an optical disk, etc.

The application clearing method, device, storage medium and electronic device provided by the embodiments of the present disclosure are described in detail. The principles and implementation manners of the application are described in the specific examples. The description of the above embodiments is only The method for understanding the present disclosure and its core idea; at the same time, those skilled in the art, according to the idea of the present disclosure, there will be changes in the specific embodiment and the scope of application, in summary, the present specification The content should not be construed as limiting the application.

What is claimed is:

1. An application cleaning method, comprising:
    collecting multi-dimensional features of an application as samples, and constructing a sample set of the application;
    classifying the sample set according to information gain ratios of the multi-dimensional features relative to a sample classification, to construct a decision tree model of the application, wherein an output of the decision tree model comprises cleanable or uncleanable;

collecting, at a prediction time, multi-dimensional features of the application as prediction samples; and predicting whether the application is cleanable according to the prediction samples and the decision tree model.

2. The application cleaning method of claim 1, wherein classifying the sample set according to information gain ratios of the multi-dimensional features relative to a sample classification to construct a decision tree model of the application, comprises:

generating a root node of a decision tree, and taking the sample set as node information of the root node;

determining the sample set of the root node as a target sample set to be classified currently;

obtaining information gain ratios of the multi-dimensional features in the target sample set relative to the target sample set classification;

selecting a current partitioning feature from the multi-dimensional features according to the information gain ratios;

dividing the target sample set according to the partitioning feature to obtain a plurality of sub-sample sets;

removing the partitioning feature of the sample in each of the sub-sample sets to obtain removed sub-sample sets;

generating a child node of a current node, and taking one of the removed sub-sample sets as node information of the child node;

determining whether the child node meets a preset classification termination condition;

when the child node does not meet the preset classification termination condition, updating the target sample set by the removed sub-sample set, and returning to perform the step of obtaining information gain ratios of the multi-dimensional features in the target sample set relative to the target sample set classification; and when the child node meets the preset classification termination condition, taking the child node as a leaf node, and setting an output of the leaf node according to a category of the sample in the corresponding removed sub-sample set, and the category of the sample comprises cleanable or uncleanable.

3. The application cleaning method of claim 2, wherein dividing the target sample set according to the partitioning feature comprises:

obtaining feature values of the partitioning feature in the target sample set;

dividing the target sample set according to the feature values.

4. The application cleaning method of claim 2, wherein selecting a current partitioning feature from the multi-dimensional features according to the information gain ratios comprises:

selecting a maximum target information gain ratio in the information gain ratios;

determining whether the target information gain ratio is larger than a preset threshold;

when the target information gain ratio is larger than a preset threshold, determining a multi-dimensional feature corresponding to the target information gain ratio as the current partitioning feature.

5. The application cleaning method of claim 4, further comprising:

when the target information gain ratio is not larger than the preset threshold, taking the current node as a leaf node, and taking the category of which the number of the sample is the largest as the output of the leaf node.

6. The application cleaning method of claim 2, wherein determining whether the child node meets a preset classification termination condition comprises:

determining whether the number of the category of the samples in the removed sub-sample set corresponding to the child node is a preset number;

when the number of categories of the samples in the removed sub-sample set corresponding to the child node is a preset number, determining that the child node meets the preset classification termination condition.

7. The application cleaning method of claim 2, wherein obtaining information gain ratios of the multi-dimensional features in the target sample set relative to the target sample set classification comprises:

obtaining information gains of the multi-dimensional features relative to the target sample set classification;

obtaining splitting information of the multi-dimensional features relative to the target sample set classification;

obtaining the information gain ratios of the features relative to the target sample set classification according to the information gains and the splitting information.

8. The application cleaning method of claim 7, wherein obtaining the information gains of the multi-dimensional features relative to the target sample set classification comprises:

obtaining empirical entropies of the target sample set classification;

obtaining conditional entropies of the multi-dimensional features relative to a classification result of the target sample set;

obtaining the information gains of the multi-dimensional features for the target sample set classification according to the conditional entropies and the empirical entropies.

9. The application cleaning method of claim 8, wherein obtaining the empirical entropy of the target sample classification, comprises:

obtaining a first probability of positive samples occurring in the sample set, and a second probability of negative samples occurring in the sample set, the positive samples are samples whose category is cleanable, and the negative samples are samples whose category is uncleanable;

obtaining the empirical entropy of the sample according to the first probability and the second probability.

10. The application cleaning method of claim 7, wherein obtaining the information gain ratios of the multi-dimensional features relative to the target sample set classification according to the information gains and the splitting information, comprises:

calculating the information gain ratios of the multi-dimensional features relative to the target sample set classification by the following formula:

$$g_R(D, A) = \frac{g(D, A)}{H_A(D)}$$

wherein $g_R(D,A)$ is the information gain ratio of a feature A relative to a sample set D classification, $g(D,A)$ is the information gain of the feature A relative to the sample classification, and $H_A(D)$ is the splitting information of the feature A;

g(D,A) can be calculated by the following formula:

$$g(D, A) = H(D) - H(D \mid A) = H(D) - \sum_{i=1}^{n} p_i H(D \mid A = A_i)$$

wherein H(D) is the empirical entropy of the sample set D classification, H(D|A) is the conditional entropy of the feature A relative to the sample set D classification, and $p_i$ is the probability of a sample whose feature A taking the i-th value in the sample set D, n and i are both positive integers larger than zero.

11. A non-transitory storage medium having a computer program stored thereon, wherein when the computer program is run on a computer, the computer executes the application cleaning method, the method comprising:
collecting multi-dimensional features of an application as samples, and constructing a sample set of the application;
classifying the sample set according to information gain ratios of the multi-dimensional features relative to a sample classification, to construct a decision tree model of the application, wherein an output of the decision tree model comprises cleanable or uncleanable;
collecting, at a prediction time, multi-dimensional features of the application as prediction samples; and
predicting whether the application is uncleanable according to the prediction samples and the decision tree model.

12. The non-transitory storage medium of claim 11, wherein classifying the sample set according to information gain ratios of the multi-dimensional features relative to a sample classification to construct a decision tree model of the application, comprises:
generating a root node of a decision tree;
determining the sample set of the root node as a target sample set to be classified currently;
obtaining information gain ratios of the multi-dimensional features in the target sample set relative to the target sample set classification;
selecting a current partitioning feature from the multi-dimensional features according to the information gain ratios;
dividing the target sample set according to the partitioning feature to obtain a plurality of sub-sample sets;
removing the partitioning feature of the sample in each of the sub-sample sets to obtain removed sub-sample sets;
generating a child node of a current node;
determining whether the child node meets a preset classification termination condition;
when the child node does not meet the preset classification termination condition, updating the target sample set by the removed sub-sample set, and returning to perform the step of obtaining information gain ratios of the multi-dimensional features in the target sample set relative to the target sample set classification; and
when the child node meets the preset classification termination condition, taking the child node as a leaf node, and setting an output of the leaf node according to a category of the sample in the corresponding removed sub-sample set, and the category of the sample comprises cleanable or uncleanable.

13. The non-transitory storage medium of claim 12, wherein dividing the target sample set according to the partitioning feature comprises:
obtaining feature values of the partitioning feature in the target sample set;
dividing the target sample set according to the feature values.

14. The non-transitory storage medium of claim 12, wherein selecting a current partitioning feature from the multi-dimensional features according to the information gain ratios comprises:
selecting a maximum target information gain ratio in the information gain ratios;
determining whether the target information gain ratio is larger than a preset threshold;
when the target information gain ratio is larger than a preset threshold, determining a multi-dimensional feature corresponding to the target information gain ratio as the current partitioning feature.

15. The non-transitory storage medium of claim 14, further comprising:
when the target information gain ratio is not larger than the preset threshold, taking the current node as a leaf node, and taking the category of which the number of the sample is the largest as the output of the leaf node.

16. The non-transitory storage medium of claim 12, wherein determining whether the child node meets a preset classification termination condition comprises:
determining whether the number of the category of the samples in the removed sub-sample set corresponding to the child node is a preset number;
when the number of categories of the samples in the removed sub-sample set corresponding to the child node is a preset number, determining that the child node meets the preset classification termination condition.

17. The non-transitory storage medium of claim 12, wherein obtaining information gain ratios of the multi-dimensional features in the target sample set relative to the target sample set classification comprises:
obtaining information gains of the multi-dimensional features relative to the target sample set classification;
obtaining splitting information of the multi-dimensional features relative to the target sample set classification;
obtaining the information gain ratios of the features relative to the target sample set classification according to the information gains and the splitting information.

18. The non-transitory storage medium of claim 17, wherein obtaining the information gains of the multi-dimensional features relative to the target sample set classification comprises:
obtaining empirical entropies of the target sample set classification;
obtaining conditional entropies of the multi-dimensional features relative to a classification result of the target sample set;
obtaining the information gains of the multi-dimensional features for the target sample set classification according to the conditional entropies and the empirical entropies.

19. The non-transitory storage medium of claim 17, wherein obtaining the information gain ratios of the multi-dimensional features relative to the target sample set classification according to the information gains and the splitting information, comprises:
calculating the information gain ratios of the multi-dimensional features relative to the target sample set classification by the following formula:

$$g_R(D, A) = \frac{g(D, A)}{H_A(D)}$$

wherein $g_R(D,A)$ is the information gain ratio of a feature A relative to a sample set D classification, $g(D,A)$ is the information gain of the feature A relative to the sample classification, and $H_A(D)$ is the splitting information of the feature A;

$g(D,A)$ can be calculated by the following formula:

$$g(D, A) = H(D)\text{-}H(D\mid A) = H(D) - \sum_{i=1}^{n} p_i H(D\mid A = A_i)$$

wherein $H(D)$ is the empirical entropy of the sample set D classification, $H(D|A)$ is the conditional entropy of the feature A relative to the sample set D classification, and $p_i$ is the probability of a sample whose feature A taking the i-th value in the sample set D, n and i are both positive integers larger than zero.

20. An electronic device comprising a processor and a memory, the memory storing a computer program, wherein the processor is configured to execute the application cleaning method, the method comprising;
collecting multi-dimensional features of an application as samples, and constructing a sample set of the application;
classifying the sample set according to information gain ratios of the features relative to a sample classification, to construct a decision tree model of the application, wherein an output of the decision tree model comprises cleanable or uncleanable;
collecting, at a prediction time, multi-dimensional features of the application as prediction samples; and
predicting whether the application is cleanable according to the prediction samples and the decision tree model.

* * * * *